US009045099B2

(12) United States Patent
Merulla (10) Patent No.: US 9,045,099 B2
(45) Date of Patent: Jun. 2, 2015

(54) COLLAPSIBLE STRUT WITH CONTROLLED DEFORMATION FOR THE FRAME OF A ROAD VEHICLE

(71) Applicant: Ferrari S.p.A., Modena (IT)

(72) Inventor: Andrea Merulla, Carpi (IT)

(73) Assignee: Ferrari S.p.A. (IT)

( * ) Notice: Subject to any disclaimer, the term of this patent is extended or adjusted under 35 U.S.C. 154(b) by 10 days.

(21) Appl. No.: 13/894,698

(22) Filed: May 15, 2013

(65) Prior Publication Data

US 2013/0307289 A1    Nov. 21, 2013

(30) Foreign Application Priority Data

May 16, 2012    (IT) .............................. BO2012A0271

(51) Int. Cl.
*B60R 19/34*    (2006.01)
*B62D 21/15*    (2006.01)
*F16F 7/12*    (2006.01)

(52) U.S. Cl.
CPC .............. *B60R 19/34* (2013.01); *B62D 21/152* (2013.01); *F16F 7/12* (2013.01)

(58) Field of Classification Search
CPC ...... B60R 19/34; B62D 21/15; B62D 21/152; F16F 7/003; F16F 7/12
USPC ......... 180/311; 280/784; 296/187.09, 203.01, 296/203.02, 204, 205
See application file for complete search history.

(56) References Cited

U.S. PATENT DOCUMENTS

| | | | | |
|---|---|---|---|---|
| 4,152,012 A | * | 5/1979 | Reidelbach et al. | ........... 280/784 |
| 5,314,229 A | * | 5/1994 | Matuzawa et al. | ....... 296/187.09 |
| 5,419,416 A | * | 5/1995 | Miyashita et al. | ............ 188/371 |
| 6,219,919 B1 | * | 4/2001 | Gogo et al. | .................. 29/897.2 |
| 6,406,088 B1 | * | 6/2002 | Tate | .......................... 296/187.03 |
| 6,588,830 B1 | | 7/2003 | Schmidt et al. | |
| 6,655,728 B2 | * | 12/2003 | Sano et al. | ............... 296/187.09 |
| 6,893,078 B2 | * | 5/2005 | Saeki | ........................ 296/187.09 |
| 7,201,249 B2 | * | 4/2007 | Kosaka | .......................... 180/274 |
| 7,454,942 B2 | * | 11/2008 | Schulze | ..................... 72/370.22 |

(Continued)

FOREIGN PATENT DOCUMENTS

| | | |
|---|---|---|
| DE | 19510299 A1 | 9/1996 |
| EP | 0900717 A2 | 3/1999 |

(Continued)

OTHER PUBLICATIONS

"Italian Application Serial No. BO20120271, Search Report dated Jan. 11, 2013", 7 pgs.

(Continued)

*Primary Examiner* — Glenn Dayoan
*Assistant Examiner* — Paul Chenevert
(74) *Attorney, Agent, or Firm* — Schwegman Lundberg & Woessner, P.A.

(57) ABSTRACT

A collapsible strut with controlled deformation for the frame of a road vehicle, the strut consists of an internally hollow tubular body, which presents a closed transverse section, extends between an inner end and an outer end, which are axially opposite to one another, is suited to be fixed in a projecting manner to the frame of the road vehicle at the inner end, and fulfills the function of deforming in a controlled manner in case of crash, thus collapsing axially, furthermore the strut presents a thickness which axially varies from the inner end to the outer end.

14 Claims, 6 Drawing Sheets

(56) References Cited

U.S. PATENT DOCUMENTS

| | | |
|---|---|---|
| 7,695,052 B2 * | 4/2010 | Nusier et al. ............ 296/187.09 |
| 2003/0090127 A1 * | 5/2003 | Saeki ............................ 296/188 |
| 2004/0119321 A1 * | 6/2004 | Kasuga ........................ 296/205 |
| 2004/0166354 A1 | 8/2004 | Schulze |
| 2008/0007088 A1 * | 1/2008 | Newport ................. 296/187.03 |
| 2010/0013295 A1 * | 1/2010 | Spielmann et al. ........ 301/124.1 |
| 2011/0015902 A1 * | 1/2011 | Cheng et al. ...................... 703/1 |
| 2011/0233961 A1 | 9/2011 | Verbrugge |
| 2013/0056114 A1 * | 3/2013 | Lepre ............................ 148/559 |
| 2014/0302939 A1 * | 10/2014 | Kehrl ............................ 464/181 |

FOREIGN PATENT DOCUMENTS

| | | |
|---|---|---|
| WO | WO-0030916 A1 | 6/2000 |
| WO | WO-03033332 A2 | 4/2003 |

OTHER PUBLICATIONS

"European Application Serial No. 13168142.1, European Search Report mailed Aug. 13, 2013", 6 pgs.

"European Application Serial No. 13168142.1, Response filed Oct. 10, 2013", 8 pgs.

* cited by examiner

COLLAPSIBLE STRUT WITH CONTROLLED DEFORMATION FOR THE FRAME OF A ROAD VEHICLE

PRIORITY CLAIM AND RELATED APPLICATIONS

This application claims the benefit of priority under 35 U.S.C. Section 119 to Italian Patent Application Serial No. B02012A 000271, filed on May 16, 2012, which application is incorporated herein by reference in its entirety.

TECHNICAL FIELD

The present invention relates to a collapsible strut with controlled deformation for the frame of a road vehicle.

BACKGROUND

The frame of a road vehicle normally comprises a central section, which is stiff (i.e. does not collapse in case of crash) and defines a safety cell, inside of which a passenger compartment is obtained, and two end sections (front and rear, respectively) which are collapsible, that is, they deform in controlled manner in case of crash. Thereby, the energy of the crash is absorbed as closely as possible by the end section of the frame involved in the crash, thus allowing the central section of the frame (inside of which the passenger compartment is defined that is to protect the occupants of the vehicle) to resist without deformations and thus at the same time reducing the decelerations to which the central section of the frame is subjected.

Normally, in each end section of the frame there are two or more collapsible struts with controlled deformation, which are oriented longitudinally and serve the function of deforming in controlled manner in case of crash; in particular, when they are loaded axially with an adequate force of compression (as happens during a crash of a certain force), the struts collapse (they compress) axially thus progressively reducing the axial dimension thereof.

In order to minimize the decelerations which the central section of the frame is subjected to in case of a crash at low speed (within 30-40 km/h) against a fixed obstacle, it can be desirable to have highly yielding (that is less resistant and therefore which greatly deform also in the presence of relatively small axial loads) collapsible struts with controlled deformation. Instead, in order to absorb all the energy of a crash at high speed (within 60-70 km/h) against a fixed obstacle, there would be a need to have little yielding (i.e. more resistance and therefore that deform in a significant manner only in the presence of increased axial loads) collapsible struts with controlled deformation. Accordingly, the dimensioning of collapsible struts with controlled deformation is necessarily a compromise between the need to protect the occupants of the road vehicle in case of crash at low speed against a fixed obstacle and the need to protect the occupants of the road vehicle in case of crash at high speed against a fixed obstacle. In other words, the dimensioning of collapsible struts with controlled deformation will allow acceptable results to be obtained in both crashes without however achieving optimal results in either of the two crashes.

Patent Application WO0030916A1, U.S. Pat. No. 6,588,830B1 and Patent Application EP0900717A1 describe a frame of a road vehicle provided with a collapsible strut with controlled deformation; the strut consists of an internally hollow tubular body and presents a thickness that axially varies from an inner end fixed in a projecting manner to the frame, to an outer end. In particular, in Patent Application WO0030916A1 and in U.S. Pat. No. 6,588,830B1, the thickness of the strut varies in a continuous manner, namely without discontinuity, grows continuously from the outer end to the inner end, and presents an absolute minimum at the outer end and an absolute maximum at the inner end.

Nevertheless, the struts described in the above-mentioned prior documents could present a relatively large mass and hence could penalize the performances of the vehicle they are installed in.

OVERVIEW

Examples of the present subject matter are to provide a collapsible strut with controlled deformation for the frame of a road vehicle, which strut is free from the above-described drawbacks and at the same time is easy and affordable to embody.

According to the present subject matter, a collapsible strut with controlled deformation for the frame of a road vehicle is provided according to that claimed by the accompanying claims.

BRIEF DESCRIPTION OF THE DRAWINGS

The present invention will now be described with reference to the accompanying drawings, which illustrate a non-limiting embodiment thereof, in which.

DETAILED DESCRIPTION

Figure 1:
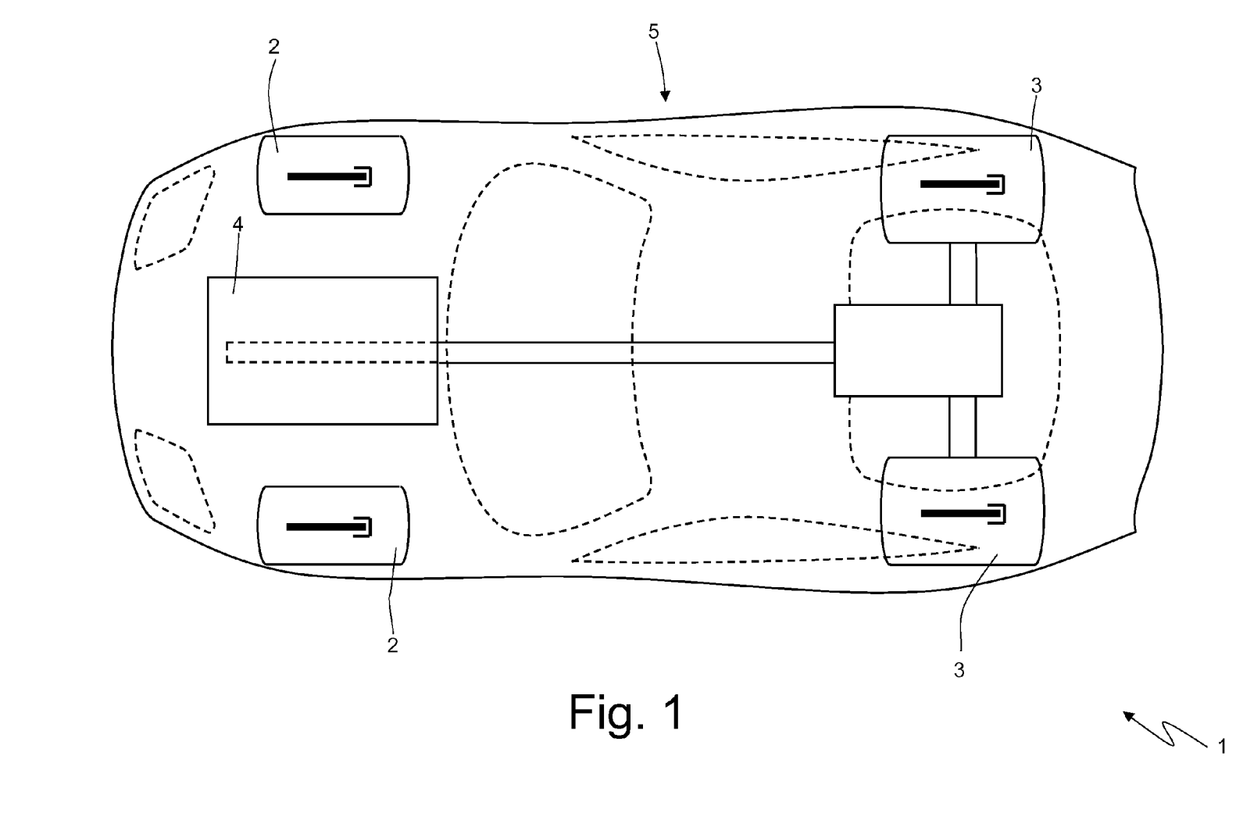
FIG. 1 is a diagrammatic and top view of a road vehicle.

Numeral 1 in FIG. 1 indicates a road vehicle as a whole, equipped with two front wheels 2 and two rear driving wheels 3, which receive the torque from an internal combustion heat engine 4 through a transmission 5.

Figure 2:
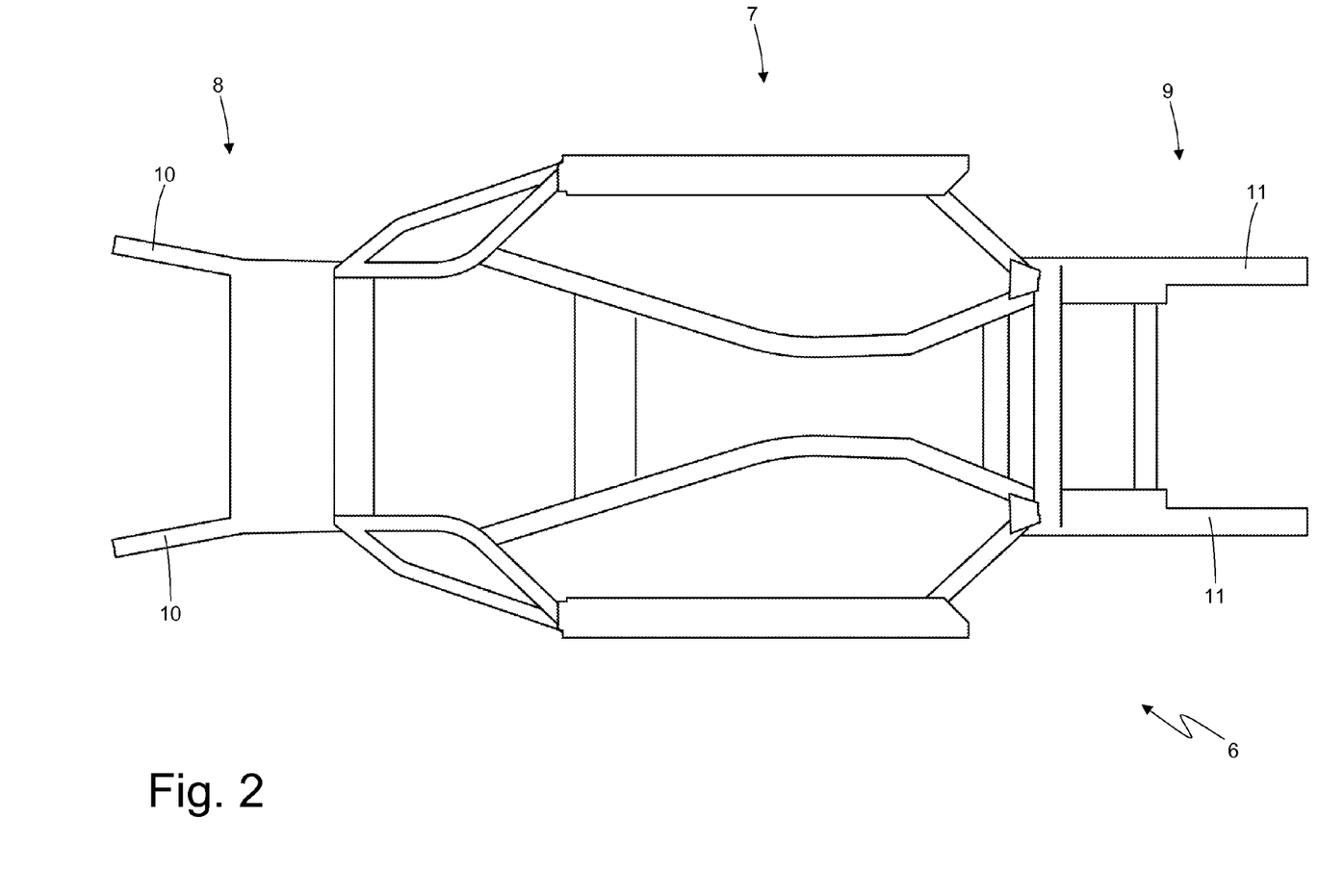
FIG. 2 is a diagrammatic and top view of a frame of the road vehicle in FIG. 1, provided with four collapsible struts with controlled deformation made in accordance with the present subject matter.

As shown in FIG. 2, the road vehicle 1 is equipped with a frame 6 comprising a central section 7, which is stiff (i.e. does not collapse in case of crash) and defines a safety cell, inside of which a passenger compartment is obtained, and two end sections 8 and 9 (a front end section 8 and a rear end section 9, respectively) which are collapsible, that is deform in controlled manner in case of crash. Thereby, the energy of the crash is absorbed as closely as possible by the deformation of the end section 8 or 9 of frame 6 involved in the crash, thus allowing the central section 7 of frame 6 (inside of which the passenger compartment is defined which is to protect the occupants of the vehicle) to resist without deformations and thus at the same time reducing the decelerations to which the central section 7 of frame 6 is subjected.

In the end sections 8 and 9 of frame 6 there are two front struts 10 and two rear struts 11, respectively, which are collapsible with controlled deformation, which are oriented longitudinally and serve the function of deforming in controlled manner in case of crash; in particular, when the struts 10 and 11 are loaded axially with an adequate force of compression (as happens during a crash of a certain intensity), the struts 10 and 11 collapse (they compress) axially thus progressively reducing the axial dimension thereof.

Figure 3:
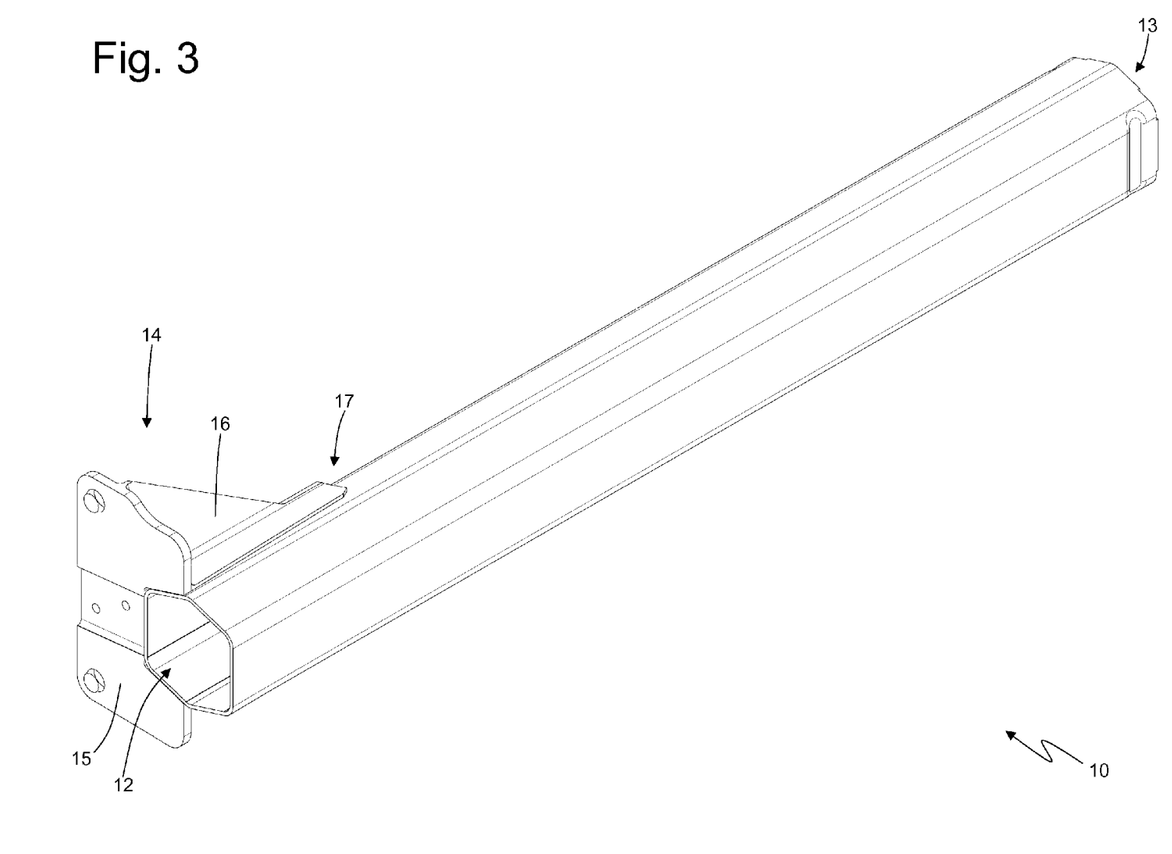
FIG. 3 is a perspective view of a front strut of the frame in FIG. 1, coupled with a fixing body.
Figure 4:
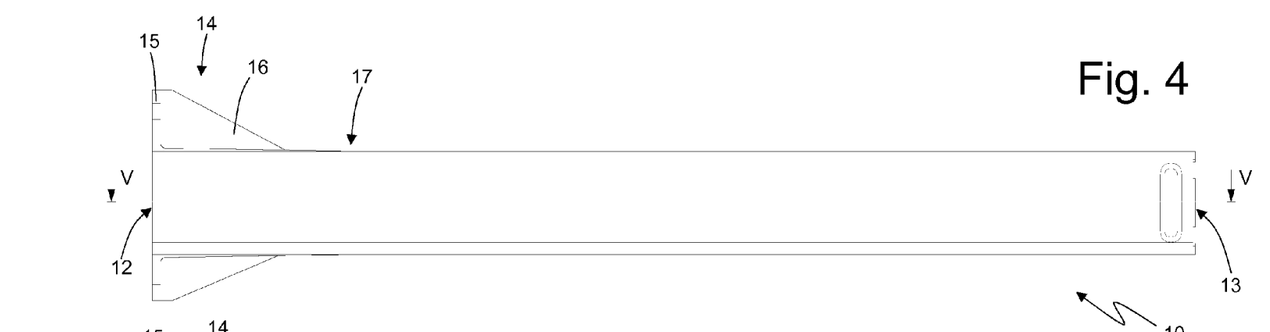
FIG. 4 is a top view of the front strut in FIG. 3, coupled with the supporting flange.

As shown in FIGS. 3-8, each front strut 10 consists of an internally hollow tubular body that presents a closed transverse section with a hexagonal shape (seen in FIG. 8) and extends between an inner end 12 (i.e. facing the inside of the road vehicle 1) and an outer end 13 (i.e. facing the outside of the road vehicle 1) axially opposite to one another (i.e. the two ends 12 and 13 are arranged on opposite sides of the front strut 10). Each front strut 10 is suited to be fixed in a projecting manner to the corresponding front end section 8 of frame 6 at the inner end 12 and by means of a fixing body 14 (clearly seen in FIG. 3), which comprises a base plate 15 which is screwed into the front end section 8 of frame 6, and a fixing plate 16, which is raised perpendicular to the base plate 15, partially embraces the front strut 10 (as shown in FIG. 3) and is glued laterally to the front strut 10. Each fixing body 14 is monolithic and is made in a single casting, therefore the base plate 15 and the fixing plate 16 are two parts of a same body.

Figure 8:
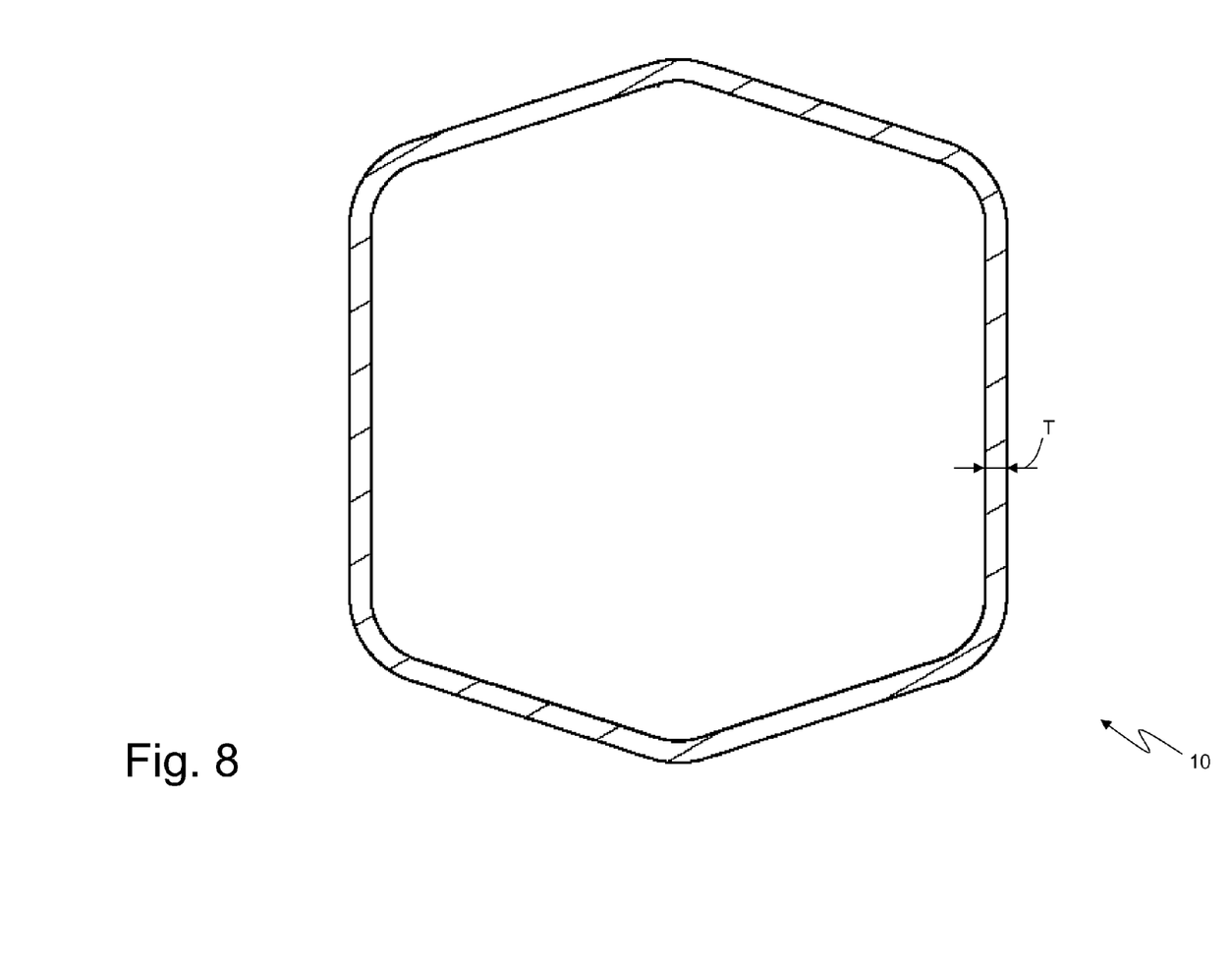
FIG. 8 is a cross-sectioned view according to line VIII-VIII, of only the front strut.

According to an embodiment shown in FIG. 8, the front strut 10 presents a closed transverse section with a hexagonal shape, in which the six sides do not all have the same length; indeed the two vertical sides are longer in length with respect to the four upper and lower sides, all four of which being the same in length. Such a shape of the closed transverse section is particularly advantageous, even though it is also possible to use other shapes (for example the circular shape or rectangular shape).

Figure 5:
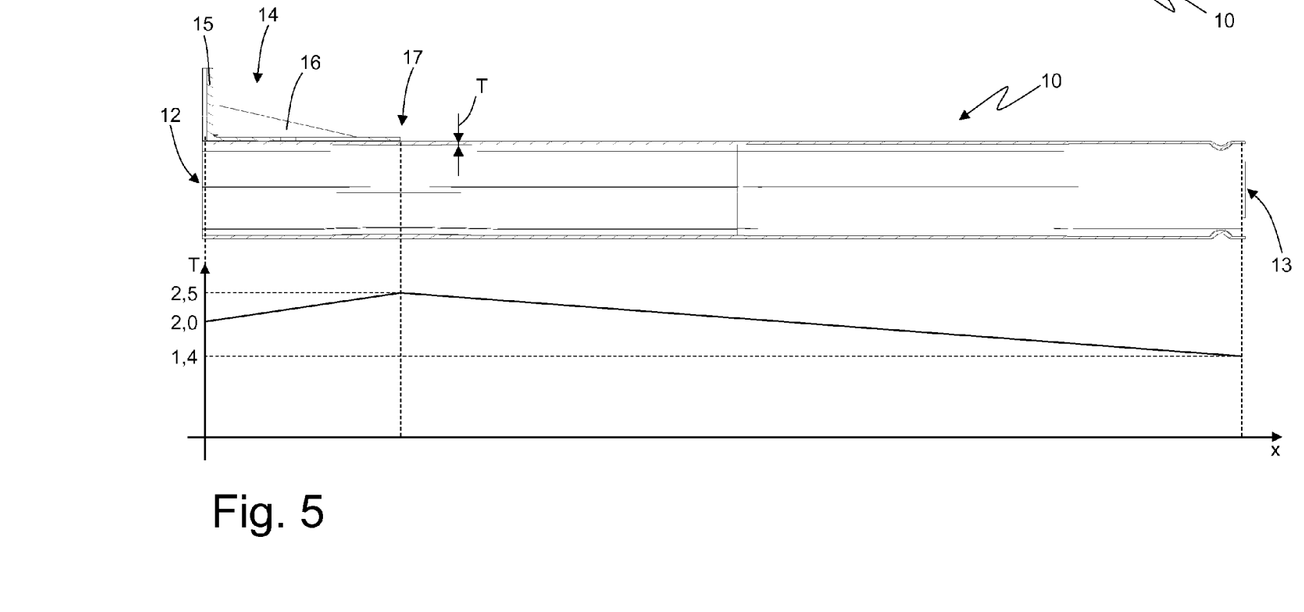
FIG. 5 is a longitudinal sectional view according to line V-V of the front strut in FIG. 3, coupled with the fixing body.
Figure 6:
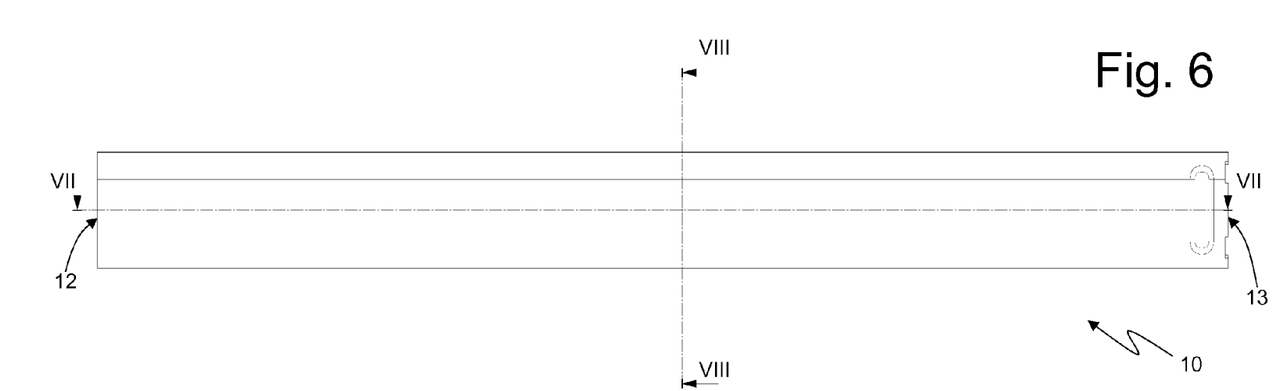
FIG. 6 is a top view of only the front strut in FIG. 3.
Figure 7:
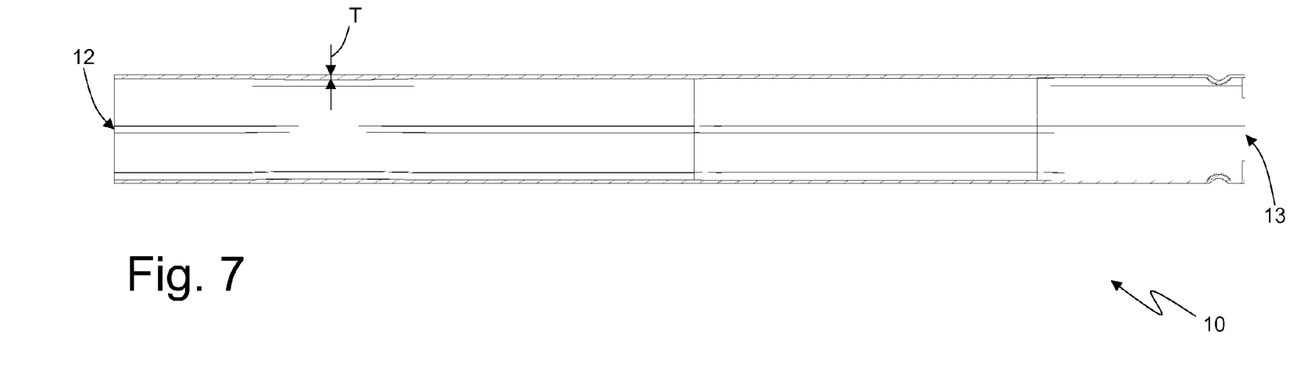
FIG. 7 is a longitudinal sectional view according to line VII-VII, of only the front strut.

As shown in FIG. 5, the front strut 10 presents a thickness T which axially varies (i.e. along the longitudinal axis) from the inner end 12 to the outer end 13; in other words, thickness T of the front strut 10 is not constant along the longitudinal axis, rather varies along the longitudinal axis while moving from the inner end 12 to the outer end 13. According to an embodiment shown in the accompanying figures, thickness T of the front strut 10 varies in a continuous manner, namely without discontinuity.

As shown in FIG. 5 (in which the trend of thickness T of the front strut 10 is shown as a function of the axial height x), thickness T of the front strut 10 presents an absolute minimum at the outer end 13 and grows as the distance from the outer end 13 itself increases. Furthermore, thickness T of the front strut 10 presents a relative minimum at the inner end 12 and grows as the distance from the inner end 12 itself increases. Lastly, thickness T of the front strut 10 presents an absolute maximum at an intermediate section 17 which is arranged between the outer end 13 and the inner end 12 close to the inner end 12; in particular, the intermediate section 17 is arranged at a final end of the fixing body 14 (or better to the fixing plate 16 of the fixing body 14), which provides the mechanical connection between the front strut 10 and frame 6 of the road vehicle 1. In other words, thickness T of the front strut 10 decreases while moving from the intermediate section 17 towards the inner end 12 and decreases while moving from the intermediate section 17 towards the outer end 13.

To summarize, thickness T of the front strut 10 has the absolute maximum at the intermediate section 17 and decreases continuously (i.e. without ever increasing or remaining constant) and without discontinuity (i.e. without "jumps") from the intermediate section 17 towards the inner end 12 and from the intermediate section 17 towards the outer end 13. According to an embodiment, thickness T of the front strut 10 decreases continuously and in a linear manner (i.e. without discontinuity) while moving from the intermediate section 17 towards the inner end 12 with a constant first decrease rate and decreases continuously and in a linear manner (i.e. without discontinuity) while moving from the intermediate section 17 towards the outer end 13 with a second constant decrease rate, which is lower than the first decrease rate.

The most inner part of the front strut 10 included between the inner end 12 and the intermediate section 17 (i.e. the part of the front strut 10 coupled mechanically with the fixing body 14) presents a smaller thickness T (i.e. it is "discharged", that is weakened) because it is "reinforced" by the presence of the fixing body 14. Thereby it is possible to lighten the front strut 10 without any penalization in terms of performances and lateral stability.

According to an embodiment, thickness T of the front strut 10 at the outer end 13 is thinner than thickness T of the front strut 10 at the inner end 12.

By pure way of example, thickness T of the front strut 10 at the inner end 12 is equal to 2.0 mm, thickness T of the front strut 10 at the intermediate section 17 is equal to 2.5 mm, thickness T of the front strut 10 at the outer end 13 is equal to 1.4 mm.

The front struts 10 were described in detail above; the rear struts 11 are entirely similar to the front struts 10 from which they differ only in the dimensioning (i.e. in the length, width and thickness). Accordingly, there is no need also for a detailed description of the rear struts 11 to which reference is made to the preceding detailed description of the front struts 10.

The above-described strut 10 or 11 has numerous advantages.

Firstly, the above-described strut 10 or 11 allows the behaviour to be optimized both in case of crash at low speed (within 30-40 km/h) against a fixed obstacle, and in case of crash at high speed (within 60-70 km/h) against a fixed obstacle. Such a result is obtained due to the variable thickness T which allows having an outer part of strut 10 or 11 of thinner thickness T and hence more yielding (that is less resistant and therefore which greatly deforms also in the presence of relatively small axial loads); thereby in case of a crash at low speed the outer part of strut 10 or 11 greatly deforms and therefore minimizes the decelerations to which the central section 7 of frame 6 is subjected to. Furthermore, the variable thickness T allows having an inner part of strut 10 or 11 of greater thickness T and hence little yielding (that is more resistant and therefore which only greatly deforms in the presence of large axial loads); thereby in case of a crash at high speed, the inner part of strut 10 or 11 is capable of absorbing all the energy of the crash.

In other words, due to the variable thickness T of strut 10 or 11, the outer part of strut 10 or 11 (of smaller thickness T) is optimized to best protect the occupants of the road vehicle 1 in case of crash at low speed, while the inner part of strut 10 or 11 (of greater thickness T) is optimized to best protect the occupants of the road vehicle 1 in case of crash at high speed.

Furthermore, with respect to a similar conventional strut with constant thickness, the above-described strut 10 and 11 also presents increased lateral stability in case of crash against an inclined barrier. Indeed, the increased thickness T of strut 10 and 11 which peaks with the absolute maximum at the intermediate section 17 serves the double function of ensuring an increase in absorbed energy in case of head-on crash at high speed and, at the same time, in improved lateral stability of strut 10 and 11.

Lastly, the above-described strut 10 or 11 is affordable and quick to manufacture because it can be manufactured with mechanical processing (expanding, drawing and pot die forming) which is known, is easy to automate and does not require particularly complex and/or costly equipment.

The invention claimed is:

1. A collapsible strut with controlled deformation for a frame of a road vehicle, comprising:
    an internally hollow tubular body, which presents a closed transverse section, extending between an inner end and an outer end, which are axially opposite to one another, and fixed in a projecting manner to the frame of the road vehicle at the inner end, and is to deform in a controlled manner in case of crash, collapsing axially,
    wherein the body has a thickness which axially varies in a continuous manner from the inner end to the outer end that the thickness of the body is continually changing from the inner end to the outer end;
    wherein the thickness presents an absolute maximum at an intermediate section that is arranged between the outer end and the inner end closer to the inner end;
    wherein the thickness decreases from the intermediate section towards the inner end and decreases from the intermediate section towards the outer end;
    wherein the thickness presents an absolute minimum at the outer end and presents a relative minimum, which is higher than the absolute minimum, at the inner end.

2. A strut according to claim 1, wherein the thickness presents an absolute minimum at the outer end and increases as the distance from the outer end itself increases.

3. A strut according to claim 1, wherein the thickness presents a relative minimum at the inner end and increases as the distance from the inner end itself increases.

4. A strut according to claim 1, wherein the intermediate section is arranged at a final end of a fixing body, which provides a mechanical connection between the strut and the frame of the road vehicle.

5. A strut according to claim 1, wherein the thickness decreases from the intermediate section towards the inner end at a first decrease rate and decreases from the intermediate section towards the outer end at a second decrease rate, which is lower than the first decrease rate.

6. A strut according to claim 1 and presenting a transverse section with a hexagonal shape.

7. A frame of a road vehicle, comprising:
    a central section, which is stiff and defines a safety cell, inside which a passenger compartment is obtained; and
    two end sections, which are collapsible in case of crash;
    at least one end section comprises two struts, which are arranged longitudinally, where each strut comprises:
    an internally hollow tubular body, which presents a closed transverse section, extends between an inner end and an outer end, which are axially opposite to one another, is to be fixed in a projecting manner to the frame of the road vehicle at the inner end, and is to deform in a controlled manner in case of crash, collapsing axially,
    wherein the body has a thickness which axially varies from the inner end to the outer end;
    wherein the thickness presents an absolute maximum at an intermediate section that is arranged between the outer end and the inner end closer to the inner end; wherein the thickness decreases from the intermediate section towards the inner end and decreases from the intermediate section towards the outer end; and
    wherein the thickness presents an absolute minimum at the outer end and presents a relative minimum, which is higher than the absolute minimum, at the inner end.

8. A frame according to claim 7, wherein the thickness varies in a continuous manner, without discontinuity.

9. A frame according to claim 7, wherein the thickness presents an absolute minimum at the outer end and increases as the distance from the outer end itself increases.

10. A frame according to claim 7, wherein the thickness presents a relative minimum at the inner end and increases as the distance from the inner end itself increases.

11. A frame according to claim 7, wherein the thickness varies along the entire axial extension of the strut and does not have sections with a constant thickness.

12. A frame according to claim 7, wherein the intermediate section is arranged at a final end of a fixing body, which provides a mechanical connection between the strut and the frame of the road vehicle.

13. A frame according to claim 7, wherein the thickness decreases from the intermediate section towards the inner end at a first decrease rate and decreases from the intermediate section towards the outer end at a second decrease rate, which is lower than the first decrease rate.

14. A frame according to claim 7 and presenting a transverse section with a hexagonal shape.

* * * * *